United States Patent [19]

Kleinberg

[11] Patent Number: 4,856,873
[45] Date of Patent: Aug. 15, 1989

[54] DOCUMENTATION ILLUMINATION MODULE

[75] Inventor: Larry K. Kleinberg, Toluca Lake, Calif.

[73] Assignee: Storz Instrument Company, St. Louis, Mo.

[21] Appl. No.: 50,948

[22] Filed: May 15, 1987

[51] Int. Cl.⁴ .................... G02B 21/06; G02B 21/18
[52] U.S. Cl. .................... 350/502; 350/514; 350/526; 350/527; 350/528
[58] Field of Search ............ 350/502, 514, 523, 520, 350/525, 526, 527, 528

[56] References Cited

U.S. PATENT DOCUMENTS

| | | | |
|---|---|---|---|
| 4,232,933 | 11/1980 | Nakahashi | 350/502 |
| 4,302,087 | 11/1981 | Reinheimer et al. | 350/502 |
| 4,329,015 | 5/1982 | Feinbloom | 350/523 |
| 4,344,667 | 8/1982 | Wooff, Jr. | 350/502 |
| 4,515,445 | 5/1985 | Müller et al. | 350/523 |
| 4,518,230 | 5/1985 | Weber | 350/502 |
| 4,682,595 | 7/1987 | Hoerenz et al. | 350/523 |
| 4,688,907 | 8/1987 | Kleinberg | 350/520 |

Primary Examiner—Bruce Y. Arnold
Assistant Examiner—Terry S. Callaghan
Attorney, Agent, or Firm—Harness, Dickey & Pierce

[57] ABSTRACT

A documentation illumination module by which full illumination of a properly oriented image of a microscope's field-of-view is returned to a documenting camera or the like. The module includes a cavity with a forming and field-of-view-controlling lens system, channel for returning the image, focusing and magnifying lenses in the image channel, and an iris across the image channel. Fiber optics light is transmitted through the cavity and its lens system to a microscope and its field-of-view, then returned to module and to binoculars for an observer (surgeon), without need of beam splitting optical elements. Full light is available to camera and observer. The focusing and magnifying lenses are mounted in an alternatively positionable lens system, while a zoom lens assembly can be substituted therefor.

14 Claims, 6 Drawing Sheets

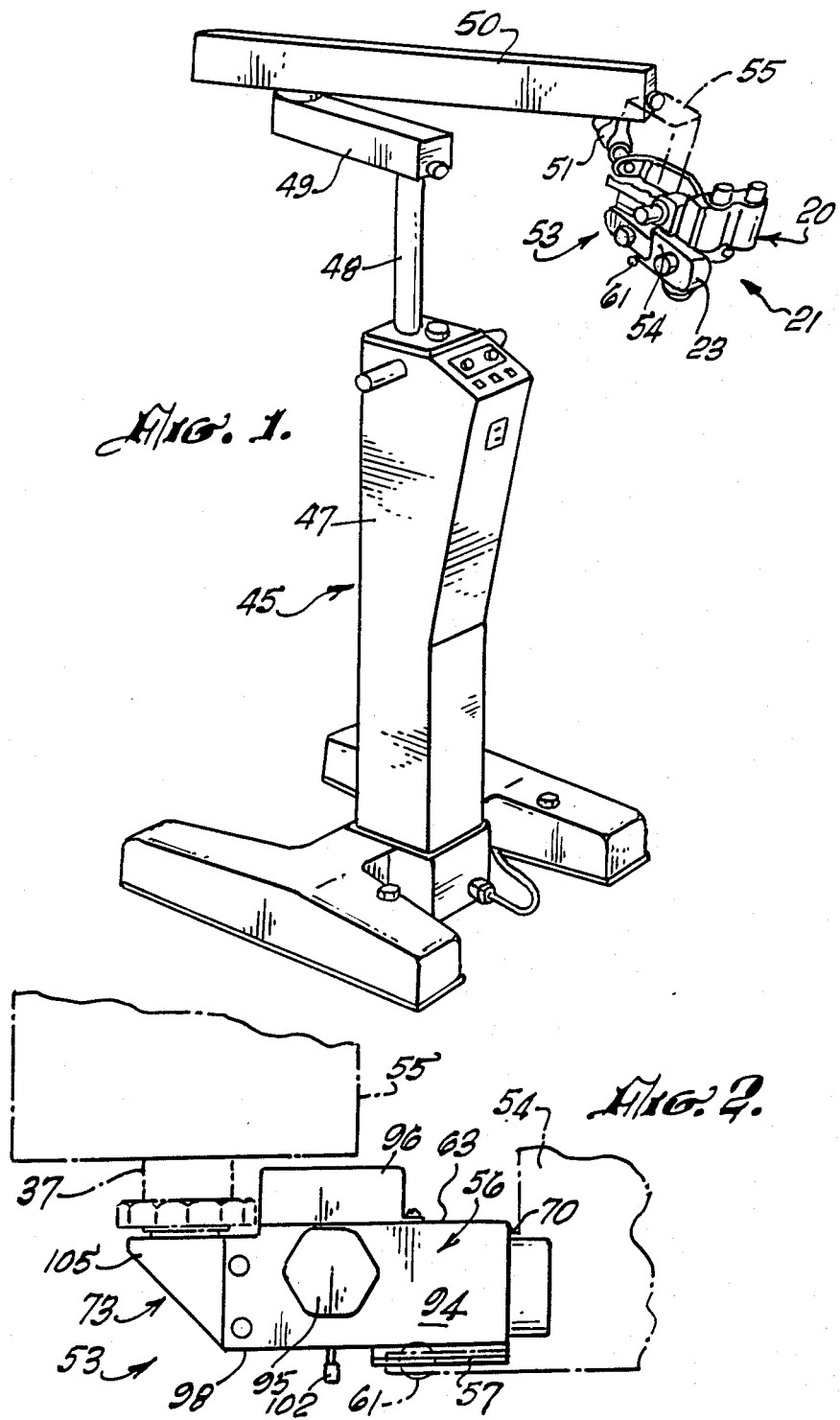

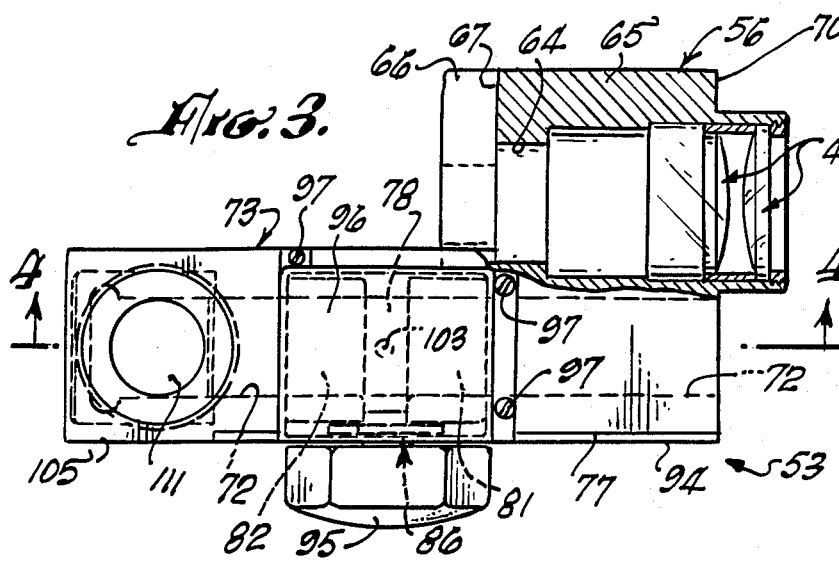
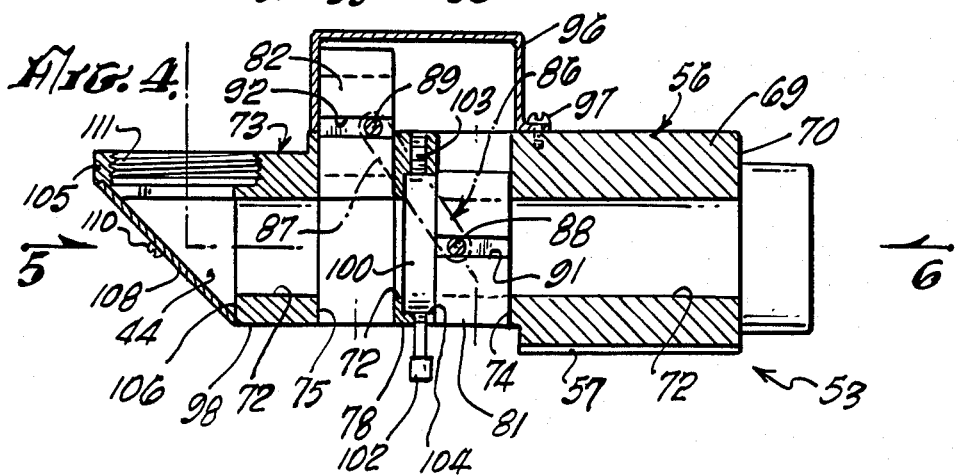
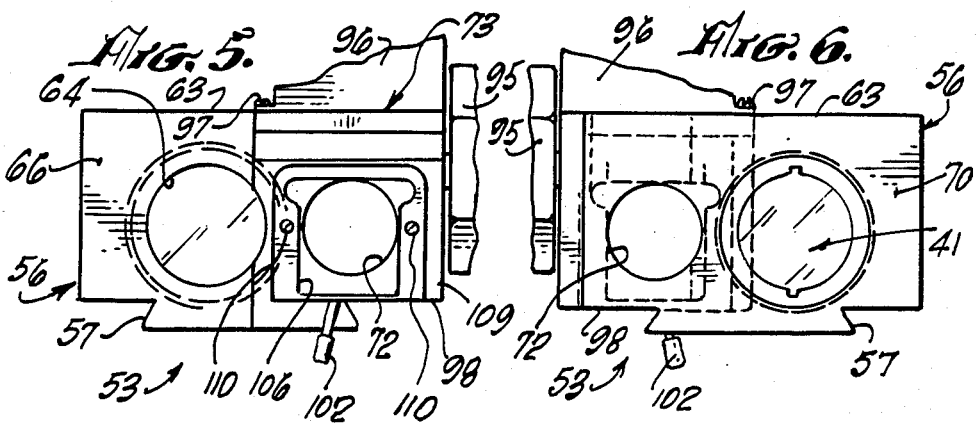

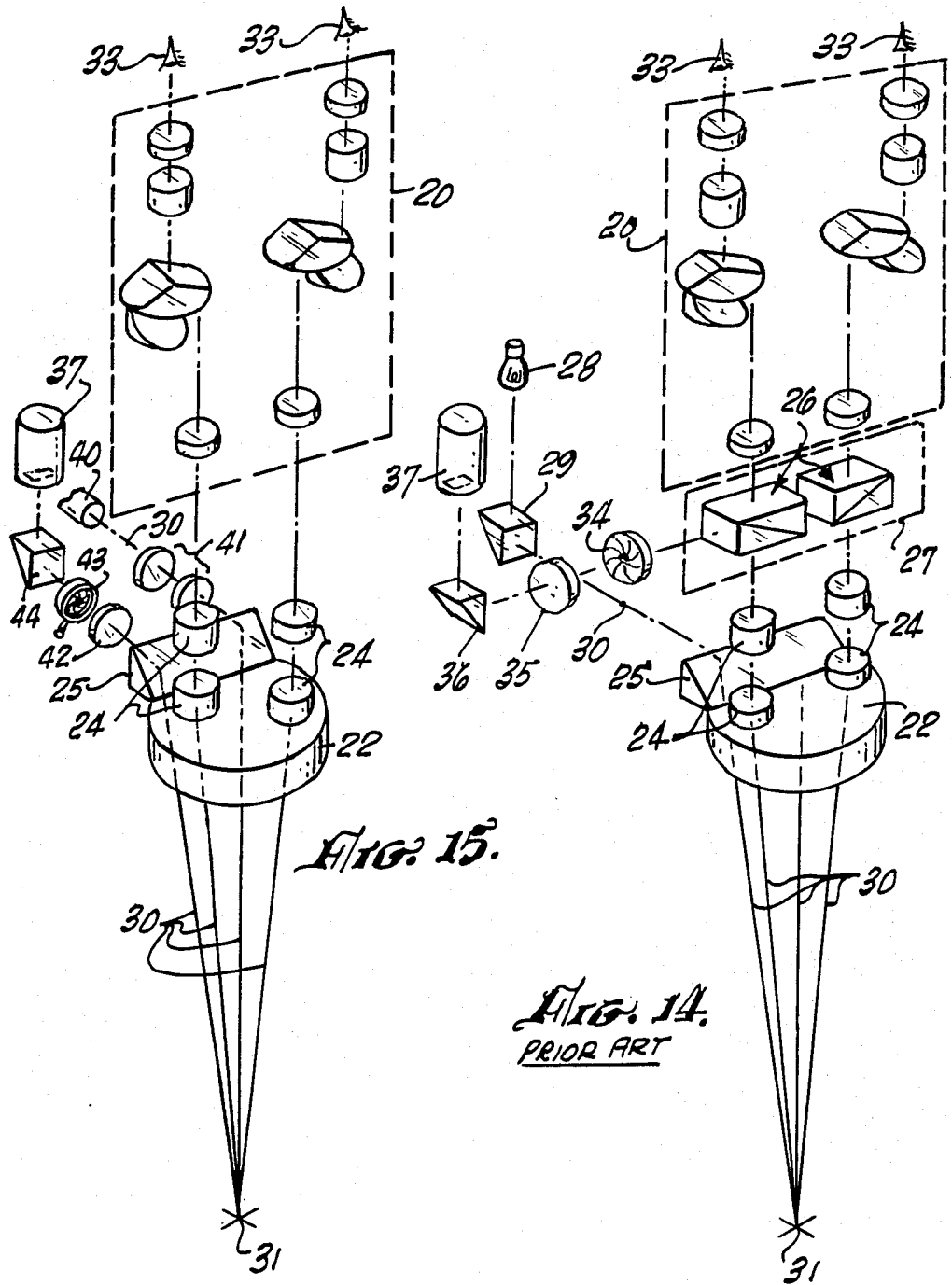

DOCUMENTATION ILLUMINATION MODULE

TECHNICAL FIELD

This invention is directed to documentation of a surgical operation, and in particular, to an attachment which is integrated into a binocular-microscope assembly used in such an operation, and whereby full illumination for documenting the operation in the documentation device is achieved in addition to full illumination through the binoculars.

BACKGROUND ART

Various kinds of attachment devices to microscopes and to documentation cameras are disclosed in the following U.S. Pat. Nos.: 2,209,532; 2,651,969; 3,820,882; 4,302,087; and 4,344,667.

DISCLOSURE OF THE INVENTION

The subject matter of the invention is an attachment module comprising a housing which includes an image channel communicating the image from a microscope-binocular system to a documentation device such as a camera, an illumination cavity and lens system therein through which an optics fiber cable transmits light to and controls the light circle at a surgeon's field-of-view via the microscope, an assembly of reciprocable magnification lenses mounted in the image channel to transmit a desired magnification of the transmitted image of the field-of-view, and a prism at one end of the channel for rectifying such image to the camera, and an adjustable iris or diaphragm mounted across the channel to control the intensity of light being transmitted to the camera via the image channel.

The attachment comprises a housing having a channel for transmitting an image of the field of view (of a surgical operation, for example), and a cavity for attaching an illumination source for the field-of-view, such as a fiber optics light transmitting cable. A lens system in the cavity forms the transmitted light and controls the size of the light circle at the (surgeon's) field-of-view. One or more magnification lens cage assemblies are disposed in alignment with the axis of an image channel for transmitting the image to a camera, and a prism at the end of such image channel is included for correcting an otherwise mirror image, so that a correctly-oriented image is documented in the camera at its film plane. An iris mounted in its ring is included in axial alignment with the image channel to control the intensity of the image to the camera. One module embodiment includes a pair of magnification lenses mounted in reciprocating cages disposed in corresponding compartments positioned across the image channel and operated alternatively for alignment with the axis of such image channel. A zoom lens system is an alternative to the pair of magnification lenses. The module itself is attached to a system assembly comprising a surgeon's binoculars and microscope, in such a manner that it does not constitute a sub-system disposed between the optical and other elements of the microscope and the binoculars. In state-of-the-art devices, beam splitting prisms are interposed in a position between the elements of the microscope and the binoculars, to provide illumination to the documentation device, and out of which non-full illumination levels result.

Various advantages are obtained in this invention. For example, there is no loss of available or full light to the surgeon viewing the surgical field-of-view (point of surgery in patient) through the binoculars. Both surgeon and documentation equipment receive full or one-hundred percent of the available light from the fiber optics source through this module. There is no need to incorporate into a microscope-binocular assembly an optical and light transmitting system separate and apart from the optical elements that constitute microscope and binoculars. In state-of-the-art devices, a dedicated structural ingredient to receive light is installed in such an assembly while it is fabricated at the factory and thus cannot be changed except by returning it to the factory for change or modification. By changing from one module with various magnification factors to another by this invention, or by changing the magnification and/or focusing lenses in the module itself, assuming the same light source, the size of the field-of-view can be varied. Different effects in terms of filtering out undesired wavelengths of light can be achieved. Loss of compactness of the microscope-binocular assembly is eliminated. This is so important to the surgeon because the distance between his eye and the-field-of-view, even though in inches or millimeters, now can be kept to a minimum, whereas the complexity of state-of-the-art assemblies as it has developed in the art continually moved his eye position further away from the surgical field-of-view.

Further, the surgeon can see at a desired magnification the field-of-view, as well as independently controlling the magnification to the documentation equipment, such as a TV or other screen, or camera. When documentation equipment is not needed, the module is readily removed, and standard elements, such as for example, a counter-weight for balancing the assembly can be reattached without the necessity of conversion tools to do so.

Another advantage is the controllability of the size of the light circle appearing at the surgical field (field-of-view) by being able to change the combination of the forming lenses in the module cavity as desired, without the necessity of returning to the factory a microscope-binocular assembly in which such forming lenses are fixed and for them to be changed.

An object of this invention is to provide a module by which a surgeon and documentation equipment gains the full illumination available to the field of view.

Another object of the invention is to eliminate the necessity of beam splitting light which reduces illumination of the field-of-view, while transmission of full light to both surgeon and the documentation device is achieved.

Another object of the invention is to provide all available light to the surgeon and documentation equipment without any loss thereof by reason of a beam splitting optical system.

A still further object of the invention is to provide independent control of the magnification to the documentation equipment, while providing desired magnification through the binoculars to the surgeon.

A still further object of the invention is to provide an attachment module which is readily removable, and which is inter-changeable with a standard type of element, such as a counter-balancing weight means, to the entire surgeon's apparatus (microscope and binoculars) to which it is mounted, without the necessity of conversion tools.

Another object of the invention is to minimize or standardize the distance between surgeon's eyes and field-of-view, such distance though small is important to the surgeon during operation.

A further object of the invention is to move documentation device further away from the center of gravity of the apparatus so that additional compensating weight or tension is not required to be structurally added to the surgeon's apparatus.

Another object of this invention is to control the size of the field-of-view independently of a microscope-binoculars assembly.

These and other objects and advantages of the invention will become more fully apparent by a complete and full reading of the following description, the appended claims thereto, and the accompanying drawing comprising six (6) sheets of fifteen (15) FIGURES.

BRIEF DESCRIPTION OF THE DRAWINGS

FIG. 1 is a perspective view of a state-of-the-art surgeon's stand to which the subject matter of the instant invention is mounted.

FIG. 2 is a side elevational view of the module constituting an embodiment of the invention, as attached to a microscope and to a camera.

FIG. 3 is a top view, partially in cross-section, of the module of FIG. 2.

FIG. 4 is a sectional view taken on line 4—4 of FIG. 3.

FIG. 5 is an end view of the module taken on line 5 of FIG. 4.

FIG. 6 is an opposing end view of the module to that in FIG. 5, taken on line 6 of FIG. 4.

FIG. 14 is a schematic diagram of an illustration of an optical and light-transmitting-train of elements utilized in state-of-the-art devices.

FIG. 15 is a schematic diagram of the optical and light-transmitting-train of elements in the instant invention.

BEST MODE FOR CARRYING OUT THE INVENTION

Figure 7:
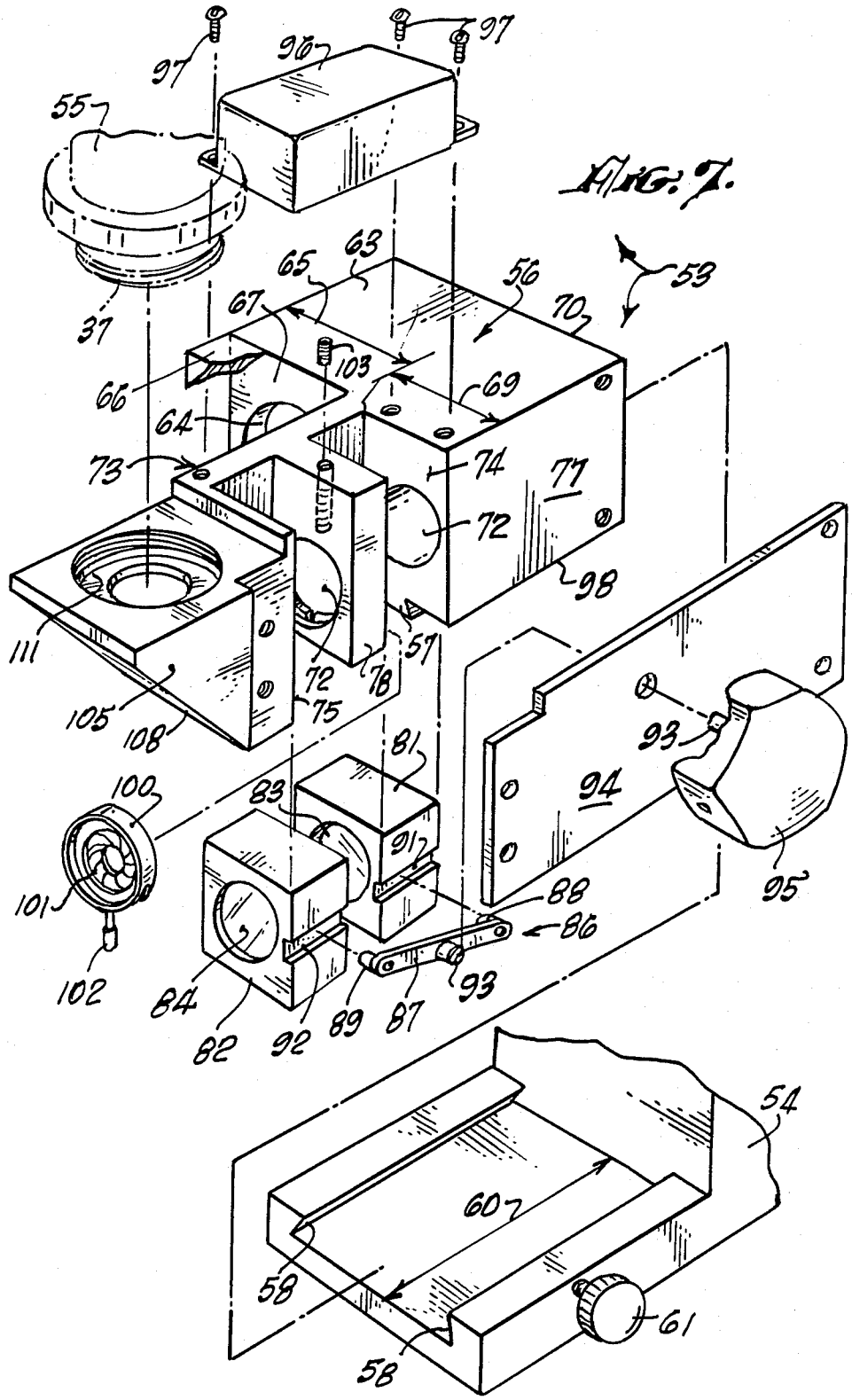
FIG. 7 is an exploded perspective view of the module shown in the previous FIGURES.

Referring now to the drawings wherein reference characters corresponded to like numerals hereinafter, the reader's attention is first directed to FIGS. 14 and 15 which provide a comparison between the optical trains-of-light and elements required or utilized in prior art devices (FIG. 14) and the optical trains-of-light and elements that are utilized in the present invention (FIG. 15) in the module.

FIG. 14 illustrates, first, optical elements in the nature of lenses and prisms that are utilized in a binocular structural formation identified by the endless phantom line 20. The structural formation 20 is included in assembly 21, FIG. 1, within such assembly, that also contains an objective lens 22 for the microscope within the housing, magnification lenses 24, and a right-angle prism 25 mounted on objective lens 22. A beam splitting system of prisms 26, identified by the endless phantom line 27, is structurally incorporated within the housing of the surgeon's microscope-binoculars assembly 21. It will be seen that as light from a source 28 passes through a right-angle prism 29, the prism being fixedly incorporated in and as a component to such assembly, the light's rays 30 are directed to and through objective lens 22 to the surgeon's field-of-view at 31. The rays 30 then are reflected back through objective lens 22, and through magnification lenses 24, to reach the beam splitting system 26. At that point, it will be seen that some of the light continues to the binocular system 20, and thus to the eyes 33 of the surgeon. Some of the light is split and transmitted through an iris 34, a lens sytem 35, a right angle prism 36, and thus to and through a coupling or apertured neck 37 on a documentation equipment, such as a camera. It becomes apparent that partial illumination is achieved at both the surgeon's eyes 33 and at the documentation device.

Turning now to FIG. 15, it illustrates the optical trains-of-light and elements for transmitting light in the operation of the instant invention. It will be seen that the binocular's scheme 20 and the objective lens system comprising elements 22, 24 and 25 are identical. However, beam splitting system, 26 no longer is incorporated within the microscope-binocular assembly. Instead, a fiber optics cable 40 provides transmission of light to a lens system 41, conventionaly and known, which forms the light for and controls the size of the circle of light at a desired field of coverage, such light then being transmitted through the right angle prism 25 in the microscope, to and through objective lens 22, to the field-of-view 31. The light then returns by reflection objective lens 22. The full illumination of such reflected light continues to advance to and through the binocular system 20 to the surgeon's eyes 33, while at the same time, full illumination is reflected through right angle prism 25 and into another lens system 42, and iris 43, and a rectifying right angle prism 44, from which it is transmitted into a documentation equipment via apertured neck 37. Full illumination to the documentation equipment is achieved. The optical elements 41, 42, 43, and 44 are elements contained within the module of this invention.

FIG. 1 illustrates a state-of-the-art surgeon's stand 45, utilized in surgery procedures and practices, and to which the instant invention and a microscope-binoculars assembly 21 is mounted. Mounted atop its main operational and control column 47, a support post 48 is vertically oriented to support a pair of rotatable arm mounts 49 and 50. Arm mounts 49, 50, are rotatably adjustable, generally in a horizontal plane, in conventional and known manner, in order to position the or assembly 21 into a desired position or location above a person on which surgery is to be performed by a surgeon who is to view the field-of-view of surgical operation through his binoculars 20 of the assembly 21. Assembly 21 is suitably detachably mounted to arm mount 50, as at 51.

The module 53 of this invention is mounted to the microscope's housing 54, FIGS. 1, 2, 7, at its one end, such housing including openings suitable for passage to and therefrom of light via module 53, while its other end is suitably mounted to the apertured neck 37 of a documentation device 55, such as a camera, TV or other screen, or the like, Included in a housing, 56 FIG. 2, for module 53, FIGS. 5, 6, 7, there is a male dovetail mounting member 57 formed along its bottom, and which is received by a female dovetail mounting member 58 formed on the rear end of the microscope's housing 54. Female member 58 is sufficiently long, as at 60, FIG. 7, in order that male member 57 seats securely thereto, the members 57, 58 being clamped together by threaded clamping knob 61 passing through one of the elements of member 58 to grip the male member 57.

Housing 56 for module 53 comprises, FIG. 7, a body formation 63 in which a cavity 64 is formed in one portion 65 thereof and into which light from a fiber optics source, such as 40, FIG. 15, is introduced in the operation of the invention. Preferably, an aluminum adapter 66 having a suitable aperture is secured to a front wall 67 of portion 65 of body formation 63 containing cavity 64, one which will accept any one of various and known types of fiber optics cable connections through which light in the cable itself is transmitted into cavity 64.

Figure 8:
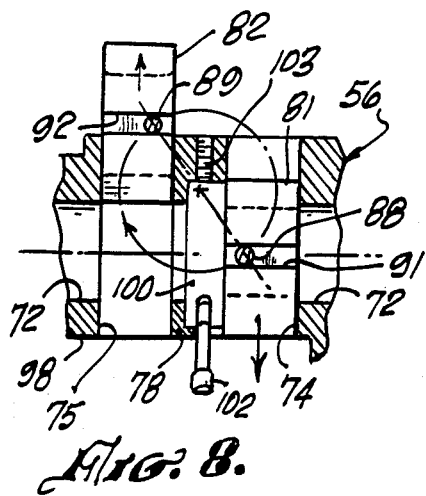
FIGS. 8 and 9 are fragmentary elevational views, partially in cross-section, of a reciprocable magnifying lens system and of an iris utilized in the subject mattter of the invention.
Figure 9:
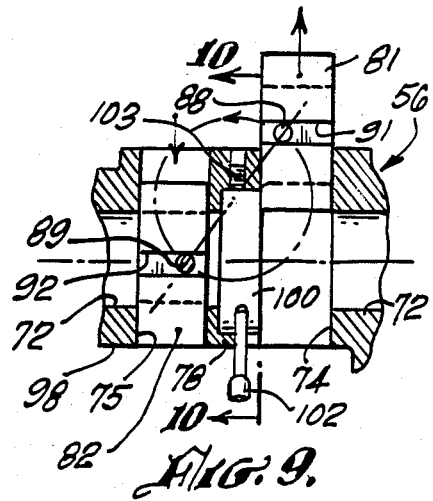

Body formation 63 includes another portion 69 also extending forwardly from its rear wall 70 and in which portion 69 an image channel 72 is formed to continue forwardly in an extension member 73 mounted to portion 69. Extension member 73 includes a pair of spaced compartments 74, 75 which open to a side wall 77 in extension member 73 and are separated by a wall 78 that contains an aperture 79, FIG. 13, through which image channel 72 continues. Each pair of lens cages 81, 82, constituting lens system 42, FIG. 15, are disposed in its corresponding compartment or slot 74, 75 for sliding or reciprocable motion in its respective slot, and by which motion focusing and magnifying lens 83, 84 in their respective cages 81, 82 are alternatively positioned in alignment with aperture 79. This sliding or reciprocable motion is obtained by a means or mechanism 86 for alternatively disposing one or the other of such lenses 83, 84 and their corresponding cages 81, 82 in such alignment. Mechanism 86 comprises a rotatable link 87, FIG. 7, having lugs 88, 89 mounted at its opposing ends for seating in their corresponding lens cage slots 91, 92 which are horizontally oriented across the depth of their respective lens cages 81, 82. A shaft 93 is securely mounted centrally of link 87 and extends through a retaining plate 94 securely mounted to and along side wall 77 of housing 56. A finger knob 95 is suitably secured to shaft 93 on the outside of retaining plate 94. As knob 95 is rotated, shaft 93 rotates link 87. The rotation of link 87 is limited by the engagement of lugs 88, 89 in their corresponding slots 91, 92 of lens cages 81, therefore 82. However, such rotation is designed to cause either cage 81 or cage 82, to be slid partially outwardly or above housing 56, FIG. 4, while the other or alternate cage with its lens remains in alignment in its corresponding slot with aperture 79 and thus channel 72. A protector or dust cap 96 is suitably secured by screws 97 to the top of extension member 73 of and over cage slots 74, 75 to protect the lens cages and lenses when it is elevated out of alignment with aperture 79. It may be noted from FIGS. 8 and 9 that neither cage 81, 82 slides below the bottom wall 98 of housing 53.

Figure 10:
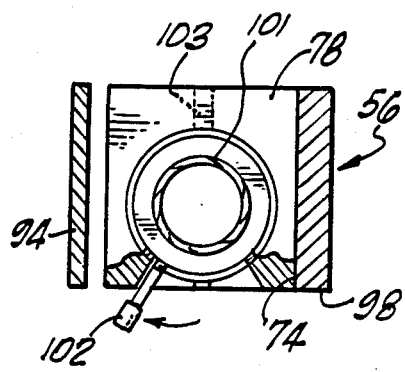
FIG. 10 is a view taken on line 10—10 of FIG. 9, with iris open.
Figure 11:
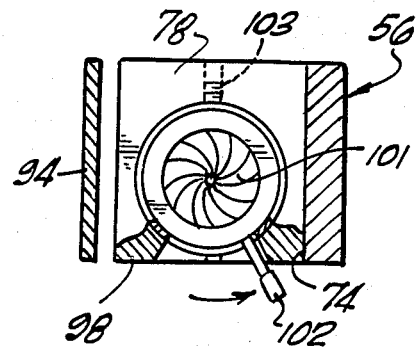
FIG. 11 is a view like FIG. 10 but with iris closed.
Figure 13:
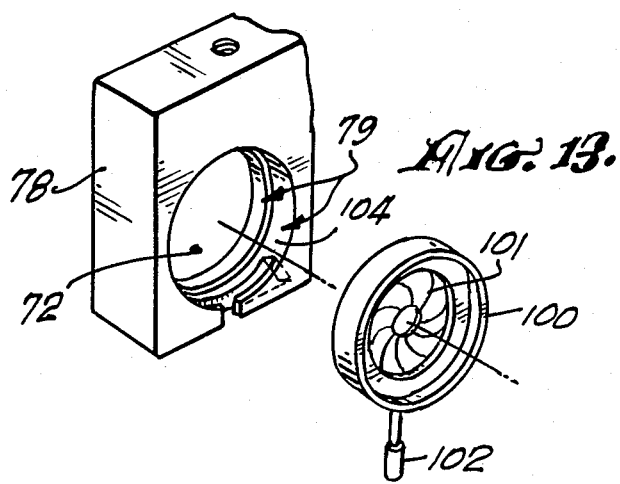
FIG. 13 is an exploded perspective fragmentary view of a manner of mounting an iris in the module.

An iris ring 100 containing an adjustable iris 101, which is iris 43 in FIG. 15, is mounted in aperture 79, FIGS. 10, 11, 13. The opening and closing of iris 101 being is controlled by a lever 102 extending down below bottom wall 98. Iris 101 performs the function of a diaphragm, controlling the intensity of light being transmitted through image channel 72 to camera 55. The iris 101 may be adjusted by the surgeon through rotation of its lever end 102. A set screw 103 secures iris ring 100 in its circular bore 104, FIG. 13, contained within wall 78.

Continuing forwardly of extension member 73, housing 56 for module 53 terminates in a pocket formation 105 containing a pocket 106, FIG. 4. The right angle prism 44, FIGS. 4, 15, seats in pocket 106 and is held therein by a metal cover plate 108 mounted at a terminal wall 109 of pocket formation 105 by suitable means such as a pair of screws 110, FIG. 5. Prism 44 corrects or rectifies the image from channel 72 for documentation purposes. Along the top of pocket formation 105, a threaded aperture 111 is formed therein for receiving a conventional documentation equipment or camera mount on apertured neck 37 by which camera 55 is suitably secured.

In operation of this invention, light is caused to travel through fiber optics cable 40 into and through adapter 66 and into the controllable lens system 41 mounted in cavity 64 and which forms the light to a desired circle of light coverage at the field-of-view 31. From cavity 64, the light is transmitted to right-angle prism 25, FIG. 15, thence through objective lens 22, and from there to the field-of-view 31 which the surgeon's eye 33 is observing through binoculars 20. Light from the field-of-view returns to the microscope, via objective lens 22, continuing in as full an illumination as is available from source 40 to binoculars 20, while full illumination also is transmitted back through right angle prism 25, to image channel 72 of module 53. No beam splitter is necessary. Such illumination of the image continues to travel through one or the other of the lenses 83, 84 in system 42 and which is in alignment with such channel 72 by reason of rotation of knob 95 to so align same by means of reciprocating its cage into alignment with aperture 79, and thus with channel 72. The full illumination of the image via rays 30 continues along channel 72 into prism 44. Without prism 44, or its equivalent such as a mirror, an undesired mirror image would be conveyed to the documenting camera 55. Prism 44 correctly orients the image to the film plane in camera 55 as rays 30 are reflected through aperture 111 into it or other documentation equipment.

The surgeon controls the amount or intensity of illumination to camera 55, by manipulating iris lever 102 that controls the opening of iris 101.

The surgeon readily changes from lens 83 to lens 84, or vice-versa, by manually rotating knob 95 in order that one or the other of their respective cages 81, 82 is positioned in its corresponding compartment 74, 75 so that the positioned lens is in alignment with image channel 72.

It now should be apparent that no beam-splitting prism or other beam splitter is required between objective lens 22 of the microscope and the binocular system 20 for providing transmission of the image appearance to documentation device 55. By module 53, a full or desired degree of intensity of illumination is brought to bear upon the film plane of camera 55.

It should be understood that suitable openings in the housing of microscope 23 are provided for communication of cavity 64 and image channel 72 with the optical elements of the microscope depicted in FIG. 15, within the skill of the mechanic in the pertinent art to so fabricate in the microscope's housing.

In assembling module 53, prefabricated iris ring 100, its iris 101 and lever 102, are introduced into counterbored aperture 104, FIG. 13, formed in wall 78 which separates the two cage compartments 74, 75. Set screw 103 secures iris ring 100 in its proper position in such aperture 104 so that lever 102 is operable to open and close iris 101. Lens cages 81, 82 and their installed corresponding lens 83, 84 are inserted into their respective compartments 74, 75 with their corresponding horizontally disposed slots 74, 75 facing side wall 77 of body formation 63. Link 87 with its lugs 88, 89 are mounted to slots 91, 92, respectively, after which retaining plate 94 is secured in place by suitable screws (not shown). Shaft 93 extends through retaining plate 94, after which knob 95 is suitably secured thereto. Dust or protector cap 96 then is secured to the top of the extension member 73 by screws 97.

Prism 44 is inserted into its pocket 106 after which metal plate 108 is suitably secured by screws 110. The series or system 41 of lens are suitably installed in cavity 64 of portion 65 in body formation 63, and a desired adaptor 66 is securely mounted to front wall 67. When module 53 is ready for utilization in assembly or system 21, FIG. 1, dovetail members 57, 58 are mounted one to the other, with clamping knob 61 securing the two together, with rear wall 70 of body formation 63 flush against the contiguous cooperating wall of housing 54 of the microscope.

Each of the aforesaid described elements are suitably fabricated by known machining processing and techniques. Metal such as aluminum is suitable for housing 56. The prisms and lenses are generated in accordance with known optical manufacturing procedures and techniques. Iris ring 100, its iris 101 and lever 102 are manufactured in accordance with well known methods of fabrication. Aluminum is a suitable material for machining the lens cages 81, 82, retaining plate 94, cap 96 and knob 95.

Figure 12:
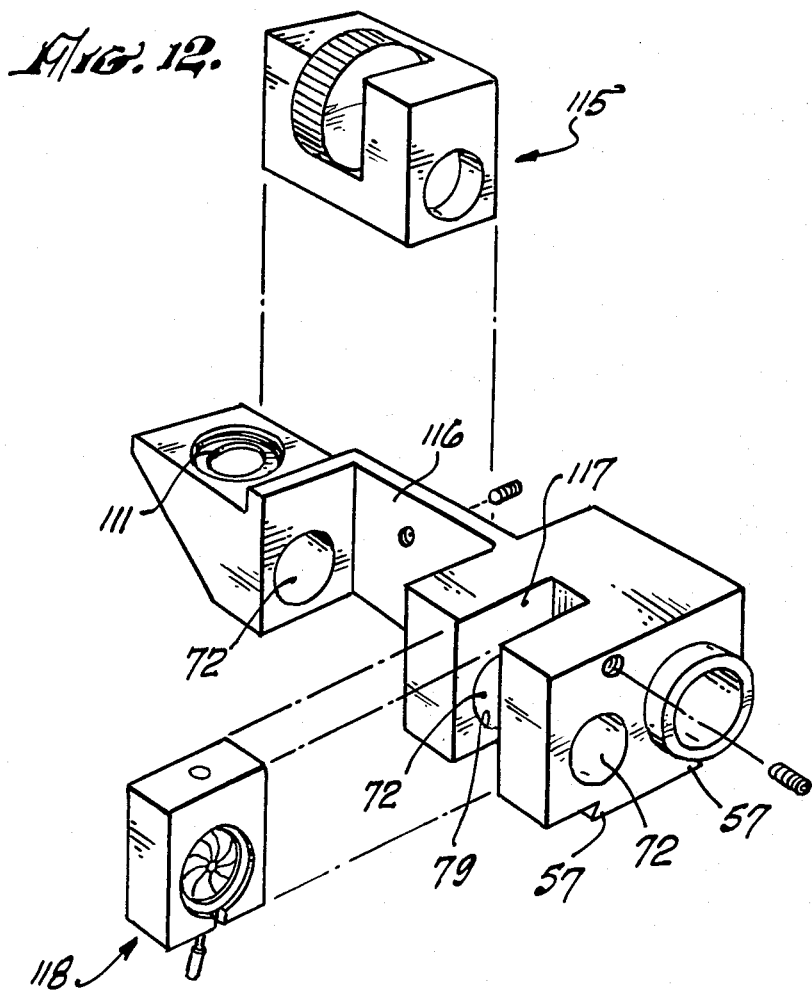
FIG. 12 is an exploded perspective view of another embodiment of the invention.

Various changes and modifications may be made in module. For example, the pair of lens cages 81, 82, their lenses, and spacing wall 78 all may be removed for the purpose of substituting a conventional or standard zoom lens system 115, FIG. 12, within a large singular compartment 116 which replace receptor slots 74, 75. A separate slot 117 facing side wall 77 is formed in portion 69 of housing 56 to house iris means 118. Both means 115, 118 are mounted and suitably secured in their locations in known fashion and are positioned in alignment with image channel 72, to function in the same way in module 53 as the above first described embodiment of the invention. Fabrication of these changes follow in the same manner as described above regarding the first described embodiment. In this manner, zoom lens system can be utilized for other well known purposes, in surgical operational procedures.

It should be understood that the scope and spirit of the invention is not limited except to the extent of the following appended cleaims.

I claim:

1. In a microscope system having at least one eyepiece for viewing a field of view and having a documentation means for receiving and recording optical images and further having a source of illumination, the improvement comprising:
    a module comprising a housing for attaching to said microscope system and to said documentation means;
    said housing having an illumination port for receiving illumination from said source of illumination;
    said housing having a means defining an illumination channel and an image channel, said illumination channel optically communicating with said illumination port and said image channel optically communicating with said documentation means;
    a common optical directing means disposed in said microscope system and communicating with said illumination channel and with said image channel for directing light from said illumination channel onto said field of view and for directing light reflected from said field of view into said image channel;
    an objective lens system disposed in said microscope system for directing light reflected from said field of view to said eyepiece, said objective lens system being disposed on a line of sight different from that of said optical directing means such that the light directed into said image channel via said optical directing means and the light directed to said eyepiece via said objective lens system are derived from different lines of sight.

2. The system of claim 1 wherein said optical directing means comprises at least one reflecting surface.

3. The system of claim 1 wherein said optical directing means comprises a prism.

4. The module of claim 1 further comprising fiber optic cable means for coupling to said illumination port and for conveying illumination from said source of illumination to said illumination port.

5. The module of claim 1 further comprising lens means disposed in said image channel, for altering the magnification of an image optically communicated to said documentation means.

6. The module of claim 5 wherein said lens means comprises a zoom lens.

7. The module of claim 1 further comprising lens system having a plurality of lenses disposed in a manually operable lens carriage means for selective interposition in said image channel.

8. The module of claim 1 further comprising means for adjusting the amount of light optically communicated through said image channel to said documentation means.

9. The module of claim 1 further comprising adjustable aperture means disposed in said image channel for altering the amount of light communicated to said documentation means.

10. The module of claim 9 wherein said adjustable aperture means is an adjuatable iris.

11. The module of claim 1 further comprising dovetail mating means for attaching said housing to said microscope system.

12. The module of claim 1 wherein said housing includes interlocking threaded means for attaching to said documentation means.

13. The module of claim 1 further comprising a plurality of lens systems mounted for sliding into and out of the optical path defined by said image channel and crank arm means coupled to said lens systems for effecting said sliding.

14. The module of claim 1 further comprising at least one lens means disposed in said illumination channel for altering the light directed to said field of view.

* * * * *

UNITED STATES PATENT AND TRADEMARK OFFICE
CERTIFICATE OF CORRECTION

PATENT NO. : 4,856,873

DATED : August 15, 1989

INVENTOR(S) : Larry K. Kleinberg

It is certified that error appears in the above-identified patent and that said Letters Patent is hereby corrected as shown below:

Column 3, Line 36, "mattter"
should be --matter--.

Column 4, Line 67, after
"like" delete --,-- and insert --.--.

Column 5, Lines 49 and 50, delete "therefore".

Column 5, Line 64, delete "being".

Column 7, Line 57, "cleaims"
should be --claims--.

Signed and Sealed this

Eighth Day of October, 1991

Attest:

HARRY F. MANBECK, JR.

*Attesting Officer*     *Commissioner of Patents and Trademarks*